United States Patent [19]

Kakuta et al.

[11] 3,966,889

[45] June 29, 1976

[54] PROCESS FOR THE RECOVERY OF SELENIUM FROM WASTE GAS

[75] Inventors: Hisashi Kakuta; Shigetada Matoba; Kenichi Shimizu; Satoshi Yamashita, all of Yokohama, Japan

[73] Assignee: Asahi Glass Co., Ltd., Tokyo, Japan

[22] Filed: Nov. 14, 1974

[21] Appl. No.: 523,747

Related U.S. Application Data

[63] Continuation of Ser. No. 384,227, July 31, 1973, abandoned.

[52] U.S. Cl. ............................. 423/510; 423/210; 423/215.5; 55/72; 55/97
[51] Int. Cl.² ............................. C01B 19/00
[58] Field of Search ............ 423/508, 510, 215.5, 423/210; 55/72, 73, 90, 97, DIG. 16

[56] References Cited
UNITED STATES PATENTS

| 1,271,899 | 7/1918 | Howard | 423/512 X |
|---|---|---|---|
| 2,349,697 | 5/1944 | Bierly | 423/510 |
| 2,809,092 | 10/1957 | Zimmerley | 75/121 X |
| 2,889,206 | 6/1959 | Hobin | 423/510 |
| 2,981,603 | 4/1961 | Tuwiner | 423/510 |
| 3,179,497 | 4/1965 | Yanagase | 55/72 |
| 3,558,268 | 1/1971 | Prater | 75/101 BE |
| 3,723,595 | 3/1973 | Spedden | 423/242 |
| 3,739,549 | 6/1973 | Hevia | 55/72 |

OTHER PUBLICATIONS

Weast, R. C. ed.; Handbook of Chemistry and Physics 55 Ed. C.R.C. Press, Cleveland, Ohio, p. E–5 (1974).

*Primary Examiner*—L. Dewayne Rutledge
*Assistant Examiner*—Michael L. Lewis
*Attorney, Agent, or Firm*—Oblon, Fisher, Spivak, McClelland & Maier

[57] ABSTRACT

Selenium is recovered from combustion waste gas, especially the combustion waste gas evolved from glass melting furnaces by a process in which the waste gas is contacted with an absorbing solution containing an alkali metal sulfite or bisulfite, whereby metallic selenium and selenium compounds are absorbed, the temperature of the waste gas is decreased and the humidity of the waste gas is increased. The treated waste gas in then passed through a moist glass fiber filter which collects the remaining amounts of selenium from the waste gas. The absorbing solution is combined with the solution used to wash the glass fiber filter and the combined solutions are treated with an acid which reduces all of the selenium present in the solution to metallic selenium which precipitates from solution.

7 Claims, 2 Drawing Figures

PROCESS FOR THE RECOVERY OF SELENIUM FROM WASTE GAS

This is a continuation of application Ser. No. 384,227, filed July 31, 1973, now abandoned.

BACKGROUND OF THE INVENTION

1. Field of the Invention

This invention relates to a process for the recovery of selenium from combustion waste gas.

2. Description of the Prior Art

The combustion waste gas which is discharged from the furnaces wherein colored glass or glass containing selenium is melted or from a pyrite calcination plant, contains selenium either in the form of elemental or metallic selenium or as a compound such as selenium dioxide. Because selenium containing materials are toxic, it is necessary to separate and recover these materials from combustion waste gases in order to prevent air pollution. Several processes for the separation or recovery of selenium materials from waste gases containing selenium have been proposed. However, none of these processes have found acceptable industrial utility for the treatment of waste gas discharged from large scale industrial operations, especially from glass melting furnaces wherein colored glass plates or glass sheets are produced.

A need, therefore, continues to exist for a process which would find widespread acceptance in the glass manufacturing industry for the removal of selenium and selenium compounds from combustion waste gases.

SUMMARY OF THE INVENTION

Accordingly, one object of this invention is to provide a process for the separation of selenium containing materials from waste gases, especially the combustion waste gases discharged from glass melting furnaces.

Another object of this invention is to provide a process for the separation of selenium materials from waste gases and to recover the separated selenium as metallic or elemental selenium.

Briefly, these objects and other objects of this invention as hereinafter will become more readily apparent can be attained by contacting a waste gas containing a selenium material with an absorbing solution containing an alkali metal sulfite or an alkali metal bisulfite wherein most of the selenium material is absorbed, the temperature of the waste gas is decreased and the humidity of the waste gas is increased. The treated waste gas is passed through a glass fiber filter wherein any remaining selenium material, i.e. metallic selenium and selenium compounds in the waste gas is collected by the moistened filter. Selenium is recovered by reducing the selenium compounds dissolved in the discharged absorbing solution and the solution used to wash the glass fiber filter, whereby metallic selenium is precipitated.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
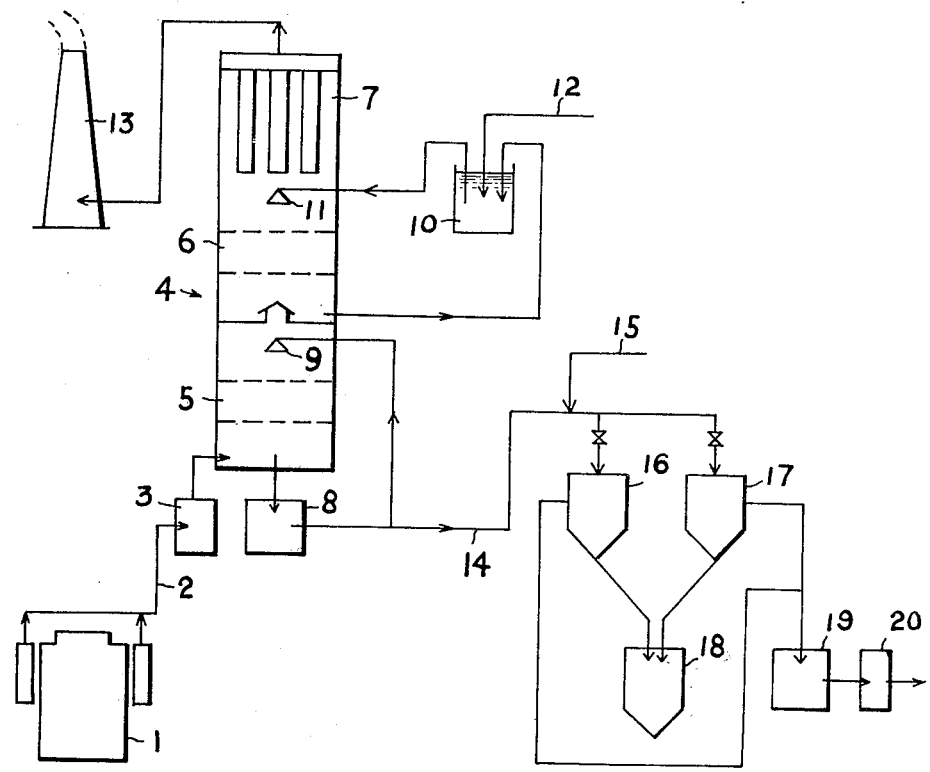
FIG. 1 is a flow-diagram of one embodiment of this invention showing the first step of contacting a waste gas containing selenium from a glass melting furnace with an absorbing solution containing an alkali metal sulfite or bisulfite, the second step of passing the waste gas through a glass fiber demister and a step in which the selenium material is recovered from the absorbing solutions discharged from the first and second steps.
Figure 2:
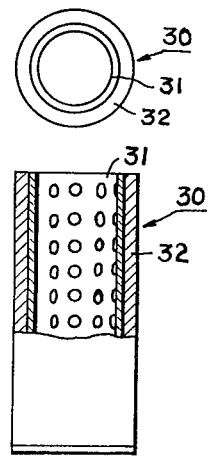
FIG. 2 is a plane view and a sectional front view of one element of a glass fiber demister.

Selenium has been widely used as a coloring agent in the manufacture of colored glass products such as plate or sheet glass having a bronze or neutral gray color. However, selenium has a low vapor pressure so that most of the selenium is vaporized in the waste gas when selenium is fed together with the glass raw materials to a glass melting furnace. About 95% of the selenium material contained in the waste gas is in the form of oxides of selenium, i.e. $SeO_2$ and $SeO_3$, and the remainder is in a form of metallic or elemental selenium or in the form of insoluble compounds. In the first step of this invention, the waste gas is contacted with an absorbing solution containing an alkali metal sulfite or an alkali metal bisulfite as an absorbent whereby most of the soluble selenium materials such as $SeO_2$ are dissolved in the solution. Suitable alkali absorbents include sodium sulfite, sodium bisulfite, potassium sulfite and potassium bisulfite. The concentration of the absorbent in the absorbing solution is usually in the range of 0.1 – 10 wt.%, preferably 0.5 – 5 wt.%.

In order to effectively separate the selenium materials, especially metallic selenium and insoluble selenium compounds which remain in the waste gas, in the post alkali absorbing step, the temperature of the waste gas is decreased to 50° – 90°C, preferably 60° – 80°C and the humidity of the waste gas is increased in this step so that moisture may condense as the temperature is decreased when the waste gas is passed through glass fiber filters. The waste gas is preferably kept very moist such that it contains a small number of water droplets. The waste gas is kept in a saturated or super saturated condition with a relative humidity lower than 110%. Many different types of gas-liquid contact apparatus are suitable for use in the first step such as sieve tray towers (perforated plate towers), packed towers, spray towers and other liquid-gas contact apparatus.

In the optimum embodiment of the first step, a sieve tray tower with two zones is used. A 0.1 – 10 wt.% solution of alkali metal hydroxide and/or alkali metal carbonate is fed to the upper zone of the tower and is recycled to the upper zone. The waste gas discharged from the glass melting furnace contains $SO_2$ which results in the formation of sulfite or bisulfite ions in the absorbing solution. The absorbing solution containing sulfite or bisulfite ions which flows downward from the upper absorption zone is recycled and a portion of the absorbing solution is fed to the zone in which the selenium materials are recovered.

The waste gas treated in the first step is passed through a glass fiber filter bed wherein the moisture present in the waste gas condenses in the filter bed which forms many liquid film layers in the depths of the filter bed. The liquid film layers absorb $SO_2$ and $SO_3$ in the waste gas and become acidic. As a result, when the waste gas containing the remaining selenium materials, especially metallic selenium and insoluble selenium compounds, contacts the liquid film layers, the selenium materials are collected and dissolve in the liquid films. The solutions containing the absorbed selenium materials which are discharged from the first and second steps, are fed to a recovery zone wherein the acidity is adjusted to a pH of 1 – 3 by the addition of acid which results in the reduction of the selenium materials to precipitated metallic or elemental selenium.

With reference to the drawings, a preferred embodiment of the process of the invention will be illustrated. A waste gas 2 containing selenium materials which is discharged from glass melting furnace 1 is passed through a waste heat boiler 3 and is cooled to about 250° – 300°C and then is fed to a lower portion of the absorption tower 4. The absorption tower 4 consists of a lower zone 5, an upper zone 6, and a glass fiber demister 7 consisting of a glass fiber bed in the upper portion of the tower. An absorbing solution is fed from tank 8 to spray 9 situated above the lower zone 5, and is sprayed into the tower to contact the upflowing waste gas and is returned to the tank 8. A portion of the absorbing solution flows down from the upper zone 6 to the lower zone 5 and is contacted with the upflowing waste gas and returned to the tank 8. The absorbing solution is fed from tank 10 to spray 11 in the upper zone 6. The absorbing solution is contacted with the waste gas and then is returned to the tank 10 and recycled. Fresh absorbing solution 12 is continuously fed to the absorbing solution in tank 10 and the combined solutions are recycled to the upper zone 6. As stated previously, the fresh absorbing solution 12 is preferably a solution of sodium hydroxide or sodium carbonate although it can be a sodium sulfite or sodium bisulfite solution.

The combustion waste gas discharged from the glass melting furnace contains large amounts of $CO_2$ so that it is important to prevent formation of $Na_2CO_3$ when the waste gas is contacted with the absorbing solution. In order to prevent the formation of $Na_2CO_3$, the pH of the absorbing solution recycled in the lower zone is preferably adjusted to from 5 – 7, especially to about 5.5. On the other hand, the pH of the absorbing solution discharged from the upper zone is preferably adjusted to from 6 – 9, especially 7 – 8. The selenium materials, especially $SeO_2$, in the waste gas react with sulfite or bisulfite ion in the absorbing solution and dissolve to form selenosulfate ($SeSO_3$).

In the practice of the first step, a simple spray tower can be used wherein a spray is provided in the upper regions of both the upper and lower zones. A blank tray is situated in the tower which separates both zones, and the tray is provided with an opening which allows free passage of the waste gas up into the upper zone and free passage of the flowing absorbing solution down into the lower zones when the level of the solution reaches a certain depth. However, in actual practice, a sieve tray tower consisting of an upper zone and a lower zone divided by a blank tray of the above-mentioned type is preferably employed. In the sieve tray tower each zone is provided with at least one sieve tray, preferably two or four sieve trays. The sieve trays are provided with a plurality of apertures ranging in diameter from 5 to 20 mm distributed uniformly across the surfaces of the trays.

The waste gas which has passed through the absorbing solution, is fed to the glass fiber demister 7. In one embodiment of the structure of the demister, cylindrical glass fiber filters 30 are suspended vertically in the upper regions of the absorption tower 4. The detailed structure of the glass fiber filters 30 is shown in FIG. 3. Each demister consists of a perforated chemical resistant metal or plastic cylinder 31 having a bottom portion and a glass fiber layer 32 wrapped around the cylinder. Waste gas that contacts the glass filters diffuses through the glass fiber layer and passes through the perforations in the plastic or metal cylinder into the interior regions of the cylinder. Thereafter, the filtered gas rises through the core of the cylinder.

It is also possible to provide shelves containing apertures or openings horizontally disposed within the upper regions of absorption tower 4, wherein each shelf is provided with a glass fiber filter layer. It is also possible to substitute a filter cloth made of glass fiber for the glass fiber filter layers on the shelves. The glass fiber filter is usually made of glass wool, however, rock wool, long glass fibers (filaments) or glass fiber cloth can be used. Usually, acid resistant or alkali resistant glass fibers containing an alkaline oxide can be used as the glass fiber for the filter layer. The density of the glass fiber filter is preferably in the range of 150 – 250 kg/m$^3$ when pressure loss is considered, and the thickness of the glass fiber filter is preferably in the range of 40 – 60 mm.

The metallic selenium and selenium compounds which remain in the waste gas after passage through the absorbing solution are collected by moist glass fiber filters. In the glass fiber demister, particles of metallic selenium and solid selenium compounds are gradually deposited on the filters which gradually increases the pressure loss of the system. In order to prevent the deposition of the particles, the filters are washed by contacting them with a solution of an alkali metal sulfite or an alkali metal bisulfite. The filters can be washed by a continuous or intermittent spray of the basic solution. However, pressure losses temporarily occur when the solution is fed to the filter layer. The temporary pressure losses of the apparatus can be prevented by separating the filter layers to be washed into groups and then washing each group of filter layers progressively. The amount of alkali metal sulfite or bisulfite used is preferably more than about 4 times by weight of the amount of metallic selenium or solid selenium compounds deposited on the filter. The metallic selenium or solid selenium compounds deposited on the glass fiber filters is dissolved in the solution and the solution gradually flows down to the lower portions of the tower.

The waste gas passes through the glass fiber demister 7 and is discharged from stack 13 to the atmosphere. The absorbing solution in the tank 8, contains the selenium materials which have been scrubbed from the waste gas as selenosulfate ion. A portion of the absorbing solution 14 is fed to a zone wherein the absorbed selenium materials are recovered. The discharged absorbing solution 14 is neutralized by addition of a solution of NaOH or KOH 15, and then is fed alternately to either tank 16 or 17. In the tanks an acid such as $H_2SO_4$ is added to the absorbing solution to adjust the pH of the solution to from 1 – 3, preferably about 2. Consequently, the metallic selenium precipitates from solution.

A portion of the selenium materials is present in the absorbing solution as selenite ion ($SeO_3^{2-}$). The selenite ion can be reduced to metallic selenium by $SO_2$, which is produced as shown in reaction (II), by the reaction shown in equation (III).

$$SO_3^{2-} + 2H^+ \rightarrow SO_2 + H_2O \qquad (II)$$

$$SeO_3^{2-} + 2SO_2 + H_2O \rightarrow Se + 2SO_4^{2-} \qquad (III)$$

When the acid is added, the absorbing solution is allowed to stand at 50°–90°C for 3–5 hours. During this time, most of the dissolved selenium materials in the absorbing solution precipitates as metallic selenium. If the absorbing solution is heated or boiled before the addition of acid, the reduction reaction is promoted. The optimum results are obtained when the solution is boiled for more than 10 minutes or when it is heated to 50°–90°C for more than 1 hour. The reduction reaction is prevented when a large amount of sulfite ion is present in the absorbing solution, and accordingly oxygen or air is preferably injected into the absorbing solution before adding acid in order to oxidize sulfite ion to sulfate ion. After the reduction reaction, the supernatant liquid is fed to tank 18 and then is passed through tank 19 and bag filter 20 which filters the fine, suspended metallic selenium particles. The solution is neutralized and then discharged. Alternatively, the precipitated metallic selenium slurry is fed to the tank 18, washed with water and dried to recover the precipitated selenium.

Having generally described this invention, a further understanding can be obtained by reference to certain specific examples which are provided herein for purposes of illustration only and are not intended to be limiting unless otherwise specified.

EXAMPLE

The composition of a waste gas and the flow rate at which it is discharged from the flue of a glass melting furnace is shown as follows:

| | |
|---|---|
| Flow rate | 25,000 Nm³/hr. |
| Temperature | 267°C |
| Composition | |
| $O_2$ | 7.4 vol. % |
| $H_2O$ | 8.0 vol. % |
| $CO_2$ | 9.2 vol. % |
| $SO_2$ | 0.107 vol. % |
| $SO_3$ | 0.008 vol. % |
| Se and Se compounds | 10.5 mg/Nm³(expressed as Se) |
| $N_2$ | balance |

The waste gas is fed to the bottom of the lower zone of a sieve tray tower. The tower is separated into an upper zone and a lower zone by a blank tray. Each zone has sieve trays. A glass fiber demister having a plurality of cylindrical glass fiber filters is provided at the top of the sieve tray tower.

The composition of the absorbing solution fed to the top of the upper zone is as follows:

| | |
|---|---|
| $Na_2CO_3$ | 4.05 wt. % |
| $Na_2SO_4$ | 0.80 wt.% |
| pH | 9.8 |

The composition of the absorption solution discharged from the bottom of the upper zone is as follows:

| | |
|---|---|
| $Na_2SO_4$ | 4.35 wt. % |
| $Na_2SO_3$ | 1.46 wt. % |
| $NaHSO_3$ | 0.15 wt. % |
| pH | 7.5 |

The composition of the absorption solution discharged from the bottom of the lower zone is as follows:

| | |
|---|---|
| $Na_2SO_4$ | 16.94 wt. % |
| $Na_2SO_3$ | 0.38 wt. % |
| $NaHSO_3$ | 8.75 wt. % |
| pH | 5.4 |

The composition of the waste gas discharged from the sieve tray tower is as follows:

| | |
|---|---|
| Temperature | 65°C |
| $SO_2$ | 0.0015 vol. % |
| $SO_3$ | 0.005 vol. % |
| $H_2O$ | 25 |
| Se and Se compounds | 7.3 mg/Nm³(expressed as Se) |
| $N_2$ and $CO_2$ | balance |

In the sieve tray tower, 30% of the Se was removed from the waste gas. The treated waste gas was passed through a glass fiber demister. After the pressure loss in the filters began to increase, the filters were dipped into a solution of 0.5 wt. % $Na_2SO_3$ in order to dissolve the deposited metallic selenium and solid selenium compounds on the glass fiber filters.

The composition of the waste gas after it passed through the glass fiber demister is as follows:

| | |
|---|---|
| Temperature | 63°C |
| $SO_2$ | 0.0015 vol. % |
| $SO_3$ | 0.0007 vol. % |
| $H_2O$ | 20 vol. % |
| Se and Se compounds | 0.1 mg/Nm³(expressed as Se) |
| $CO_2$ and $N_2$ | balance |

These results show that 90% of the selenium originally present in the waste gas was removed by the process of the invention. A portion of the absorbing solution discharged from the bottom of the sieve tray tower was fed to a tank, and was heated at 80°C for 3 hours while air was injected into the absorbing solution to oxidize excess sulfite ion.

A 10 wt.% quantity of $H_2SO_4$ was added to the solution to adjust the pH of the solution to 2 and the solution was allowed to stand at 80°C for 3 hours. As a result, 99 wt.% of the selenium materials which had dissolved in the absorbing solution precipitated as metallic selenium. The resulting metallic selenium precipitate was recovered after washing the precipitate with water and drying the precipitate.

Having now fully described the invention, it will be apparent to one of ordinary skill in the art that many changes and modifications can be made thereto without departing from the spirit or scope of the invention as set forth herein.

What is claimed as new and intended to be covered by Letters Patent is:

1. A process for the recovery of selenium from combustion waste gas, which comprises:
   contacting said combustion waste gas with a first absorbing solution which contains at least one absorbent selected from the group consisting of an alkali metal sulfite and an alkali metal bisulfite, whereby the major portion of the selenium component of said waste gas is absorbed therein, and wherein said waste gas is cooled so that the humidity of said gas is increased;
   passing said gas through a moistened glass fiber filter of glass wool having a bulk density of 150–250

$kg/m^3$, so that the residual selenium in said gas is collected thereon;

combining the selenium component collected on said filter with the first absorbing solution; and acidifying said combined solution to reduce and precipitate said selenium component to metallic selenium.

2. The process of claim 1, wherein said waste gas is contacted with said first absorbing solution which cools it to 50° – 90°C and which humidifies said waste gas by saturating or super saturating the gas with moisture.

3. The process of claim 1, wherein the concentration of said absorbent in said first absorbing solution is in the range of 0.1 – 10 wt.%.

4. The process of claim 1, wherein an alkali metal sulfite or bisulfite is produced in said first absorbing solution by contacting the waste gas with said first absorbing solution to which is continuously added an alkali metal hydroxide or carbonate, and wherein the oxides of selenium are principally removed from said waste gas by contacting the waste gas with said first absorbing solution.

5. The process of claim 1, wherein said glass fiber filter containing residual selenium thereon is washed with a second absorbing solution which comprises an alkali metal sulfite or bisulfite solution to dissolve and remove said collected selenium from said glass fiber filter.

6. The process of claim 5, wherein the pH of said first absorbing solution after contact with said waste gas is adjusted to 6 – 9, and the pH of said second absorbing solution discharged after washing said glass fiber filter is adjusted to from 5 – 7 in order to prevent the formation of sodium carbonate.

7. The process of claim 5, wherein said first and second absorbing solutions discharged after contact with said waste gas and after washing said glass fiber filters respectively are combined and adjusted to a pH of from 1 – 3 by the addition of an acid.

* * * * *